(12) United States Patent
Franken et al.

(10) Patent No.: US 7,913,287 B1
(45) Date of Patent: Mar. 22, 2011

(54) SYSTEM AND METHOD FOR DELIVERING DATA OVER AN HDTV DIGITAL TELEVISION SPECTRUM

(75) Inventors: Kenneth A. Franken, Iowa City, IA (US); Jack Perry, Marion, IA (US)

(73) Assignee: Decisionmark Corp.

( * ) Notice: Subject to any disclaimer, the term of this patent is extended or adjusted under 35 U.S.C. 154(b) by 1419 days.

(21) Appl. No.: 10/248,718

(22) Filed: Feb. 12, 2003

Related U.S. Application Data

(63) Continuation-in-part of application No. 09/681,846, filed on Jun. 15, 2001, now Pat. No. 7,028,323.

(51) Int. Cl.
*H04N 7/16* (2006.01)
(52) U.S. Cl. .............. 725/141; 725/9; 725/32
(58) Field of Classification Search .......... 725/9, 32, 725/141
See application file for complete search history.

(56) References Cited

U.S. PATENT DOCUMENTS

| | | | |
|---|---|---|---|
| 4,701,934 A | 10/1987 | Jasper | |
| 4,706,121 A | 11/1987 | Young | |
| 5,535,430 A | 7/1996 | Aoki et al. | |
| 5,555,377 A * | 9/1996 | Christensen et al. | 709/247 |
| 5,587,715 A | 12/1996 | Lewis | |
| 5,659,653 A * | 8/1997 | Diehl et al. | 386/46 |
| 5,778,135 A | 7/1998 | Ottesen et al. | |
| 5,796,948 A | 8/1998 | Cohen | |
| 5,797,082 A | 8/1998 | Lusignan | |
| 5,848,418 A | 12/1998 | De Souza et al. | |
| 5,900,915 A * | 5/1999 | Morrison | 725/44 |
| 5,950,127 A | 9/1999 | Nitta et al. | |
| 6,028,600 A | 2/2000 | Rosin et al. | |
| 6,029,045 A * | 2/2000 | Picco et al. | 725/34 |
| 6,144,944 A | 11/2000 | Kurtzman, II et al. | |
| 6,147,642 A | 11/2000 | Perry et al. | |
| 6,154,172 A | 11/2000 | Piccionelli et al. | |
| 6,209,100 B1 | 3/2001 | Robertson et al. | |
| 6,298,071 B1 * | 10/2001 | Taylor et al. | 370/486 |
| 6,332,127 B1 | 12/2001 | Bandera et al. | |
| 6,362,837 B1 | 3/2002 | Ginn | |
| 6,487,538 B1 | 11/2002 | Gupta et al. | |
| 6,594,826 B1 * | 7/2003 | Rao et al. | 725/95 |
| 6,606,659 B1 | 8/2003 | Hegli et al. | |
| 6,698,020 B1 | 2/2004 | Zigmond et al. | |

(Continued)

FOREIGN PATENT DOCUMENTS

EP 0 834 798 A3 3/1999
(Continued)

OTHER PUBLICATIONS

Printed three pages of a website on Apr. 13, 2000. The Web address was www.antennaweb.org. The Applicants know a similar website was online prior to this date but are unaware of the precise first date of such website. They suspect it may have been as early as Oct. 1, 1999.

(Continued)

*Primary Examiner* — Hunter B. Lonsberry
*Assistant Examiner* — Oschta Montoya
(74) *Attorney, Agent, or Firm* — Simmons Perrine Moyer Bergman PLC

(57) ABSTRACT

A system for delivering data including rerun digital programming via unused bandwidth of digital side channels and the Internet to consumers, which system includes a monitor for providing real time feedback of the amount of unused bandwidth available for auxiliary transmissions.

23 Claims, 2 Drawing Sheets

U.S. PATENT DOCUMENTS

| | | | |
|---|---|---|---|
| 6,732,176 B1 | 5/2004 | Stewart et al. | |
| 6,742,032 B1 | 5/2004 | Castellani et al. | |
| 6,748,422 B2 | 6/2004 | Morin et al. | |
| 6,754,833 B1 | 6/2004 | Black et al. | |
| 6,792,615 B1 | 9/2004 | Rowe et al. | |
| 6,804,675 B1 | 10/2004 | Knight et al. | |
| 6,807,566 B1 | 10/2004 | Bates et al. | |
| 6,829,599 B2 | 12/2004 | Chidlovskii | |
| 6,829,613 B1 | 12/2004 | Liddy | |
| 6,859,791 B1 | 2/2005 | Spagna et al. | |
| 6,898,571 B1 | 5/2005 | Val et al. | |
| 6,912,398 B1 | 6/2005 | Domnitz | |
| 6,966,028 B1 | 11/2005 | Beebe | |
| 6,968,513 B1 | 11/2005 | Rinebold et al. | |
| 6,976,010 B2 | 12/2005 | Banerjee et al. | |
| 6,986,156 B1* | 1/2006 | Rodriguez et al. | 725/95 |
| 7,062,533 B2 | 6/2006 | Brown et al. | |
| 7,069,234 B1 | 6/2006 | Cornelius et al. | |
| 7,069,319 B2 | 6/2006 | Zellner et al. | |
| 7,089,194 B1 | 8/2006 | Berstis et al. | |
| 7,092,953 B1 | 8/2006 | Haynes | |
| 7,103,215 B2 | 9/2006 | Buzuloiu et al. | |
| 7,120,615 B2 | 10/2006 | Sullivan et al. | |
| 7,124,101 B1 | 10/2006 | Mikurak | |
| 7,136,875 B2 | 11/2006 | Anderson et al. | |
| 7,162,471 B1 | 1/2007 | Knight et al. | |
| 7,162,508 B2 | 1/2007 | Messina | |
| 7,165,041 B1 | 1/2007 | Guheen et al. | |
| 7,171,620 B2 | 1/2007 | Castellani et al. | |
| 7,174,453 B2 | 2/2007 | Lu | |
| 7,200,635 B2 | 4/2007 | Yashchin et al. | |
| 7,219,148 B2 | 5/2007 | Rounthwaite et al. | |
| 7,219,153 B1 | 5/2007 | Day | |
| 7,222,157 B1 | 5/2007 | Sutton, Jr. et al. | |
| 7,222,163 B1 | 5/2007 | Girouard et al. | |
| 7,478,414 B1* | 1/2009 | Glusker et al. | 725/9 |
| 2001/0025255 A1 | 9/2001 | Gaudian | |
| 2001/0037415 A1 | 11/2001 | Freishtat et al. | |
| 2002/0083016 A1 | 6/2002 | Dittrich et al. | |
| 2002/0095332 A1 | 7/2002 | Doherty et al. | |
| 2002/0107701 A1 | 8/2002 | Batty et al. | |
| 2002/0144260 A1* | 10/2002 | Devara | 725/32 |
| 2002/0199188 A1 | 12/2002 | Sie et al. | |
| 2003/0004880 A1 | 1/2003 | Banerjee et al. | |
| 2003/0007092 A1* | 1/2003 | Sonner et al. | 348/463 |
| 2003/0110130 A1 | 6/2003 | Pelletier | |
| 2003/0149988 A1* | 8/2003 | Ellis et al. | 725/87 |
| 2003/0154249 A1 | 8/2003 | Crockett et al. | |
| 2003/0165241 A1 | 9/2003 | Fransdonk | |
| 2003/0171990 A1 | 9/2003 | Rao et al. | |
| 2004/0034559 A1 | 2/2004 | Harris et al. | |
| 2004/0076279 A1 | 4/2004 | Taschereau | |
| 2004/0083133 A1 | 4/2004 | Nicholas et al. | |
| 2004/0143667 A1 | 7/2004 | Jerome | |
| 2004/0236832 A1 | 11/2004 | Morris et al. | |
| 2005/0015795 A1* | 1/2005 | Iggulden | 725/20 |
| 2005/0050097 A1 | 3/2005 | Yeh et al. | |
| 2005/0071178 A1 | 3/2005 | Beckstrom et al. | |
| 2005/0071417 A1 | 3/2005 | Taylor et al. | |
| 2005/0075929 A1 | 4/2005 | Wolinsky et al. | |
| 2005/0086112 A1 | 4/2005 | Shkedi | |
| 2005/0165615 A1 | 7/2005 | Minar | |
| 2005/0187823 A1 | 8/2005 | Howes | |
| 2005/0203849 A1 | 9/2005 | Benson | |
| 2005/0204005 A1 | 9/2005 | Purcell et al. | |
| 2005/0240487 A1 | 10/2005 | Nemetz et al. | |
| 2005/0251399 A1 | 11/2005 | Agarwal et al. | |
| 2005/0256929 A1 | 11/2005 | Bartol et al. | |
| 2005/0286721 A1 | 12/2005 | Lamberg | |
| 2005/0289145 A1 | 12/2005 | Voegel | |
| 2006/0020714 A1 | 1/2006 | Girouard et al. | |
| 2006/0031483 A1 | 2/2006 | Lund et al. | |
| 2006/0058951 A1 | 3/2006 | Cooper et al. | |
| 2006/0095502 A1 | 5/2006 | Lewis et al. | |
| 2006/0106866 A1 | 5/2006 | Green et al. | |
| 2006/0173985 A1 | 8/2006 | Moore | |
| 2006/0229899 A1 | 10/2006 | Hyder et al. | |
| 2006/0235824 A1 | 10/2006 | Cheung et al. | |
| 2006/0236257 A1 | 10/2006 | Othmer et al. | |
| 2006/0242072 A1 | 10/2006 | Peled et al. | |
| 2006/0253784 A1 | 11/2006 | Bower et al. | |
| 2006/0282328 A1 | 12/2006 | Gerace et al. | |
| 2006/0282426 A1 | 12/2006 | Spears | |
| 2006/0287916 A1 | 12/2006 | Starr et al. | |
| 2007/0011155 A1 | 1/2007 | Sarkar | |
| 2007/0016598 A1 | 1/2007 | Tessman, Jr. et al. | |
| 2007/0027770 A1 | 2/2007 | Collins et al. | |
| 2007/0038567 A1 | 2/2007 | Allaire et al. | |
| 2007/0040850 A1 | 2/2007 | Coleman | |
| 2007/0047568 A1 | 3/2007 | Wang et al. | |
| 2007/0061363 A1 | 3/2007 | Ramer et al. | |
| 2007/0061839 A1 | 3/2007 | South, Jr. | |
| 2007/0063999 A1 | 3/2007 | Park | |
| 2007/0070978 A1 | 3/2007 | Bell et al. | |
| 2007/0078675 A1 | 4/2007 | Kaplan | |
| 2007/0078709 A1 | 4/2007 | Rajaram | |
| 2007/0083408 A1 | 4/2007 | Altberg et al. | |
| 2007/0083929 A1 | 4/2007 | Sprosts et al. | |
| 2007/0094263 A1 | 4/2007 | Tessman, Jr. et al. | |
| 2007/0100690 A1 | 5/2007 | Hopkins | |
| 2007/0112678 A1 | 5/2007 | Himelfarb | |
| 2007/0112735 A1 | 5/2007 | Holloway et al. | |
| 2007/0116037 A1 | 5/2007 | Moore | |
| 2007/0118533 A1 | 5/2007 | Ramer et al. | |
| 2007/0123275 A1 | 5/2007 | Faraz | |
| 2007/0124207 A1 | 5/2007 | Faber et al. | |
| 2007/0127555 A1 | 6/2007 | Lynch | |
| 2007/0127650 A1 | 6/2007 | Altberg et al. | |
| 2007/0130014 A1 | 6/2007 | Altberg et al. | |
| 2007/0130015 A1 | 6/2007 | Starr et al. | |
| 2007/0133034 A1 | 6/2007 | Jindal et al. | |
| 2007/0135991 A1 | 6/2007 | Riise et al. | |
| 2007/0136428 A1 | 6/2007 | Boutboul et al. | |

FOREIGN PATENT DOCUMENTS

| | | | |
|---|---|---|---|
| EP | 1234442 B1 | 5/2003 | |
| GB | 2 328 811 A | 3/1998 | |
| GB | 2377510 A | 1/2003 | |
| GB | 2428832 A | 2/2007 | |
| JP | 06-268934 | 9/1994 | |
| WO | WO 00/01149 | 1/2000 | |
| WO | WO 00/33576 | 6/2000 | |
| WO | WO 01/15541 A1 * | 3/2001 | |
| WO | WO 02 23435 | 3/2002 | |
| WO | WO 03038695 A1 | 8/2003 | |
| WO | WO 2007 044500 A2 | 4/2007 | |

OTHER PUBLICATIONS

Applicants are aware of use of paper maps showing color coverage areas relating to suitability of a particular antenna. Applicants are unaware of actual first date, but suspect it may be around Jan. 1, 1999.

Kageyama M. et al, "A Free Time-Shift DVD Video Recorder", IEEE Transactions on Consumer Electronics, IEEE Inc., New York, US, vol. 43, No. 3, Aug. 1, 1997, p. 469-473, XP00742519, ISSN: 0098-3063.

Printed web page for iBlast.com on May 19, 2003.

iBlast Press Release "Major Broadcast Groups Unite to Establish iBlast", Mar. 7, 2000.

iBlast Press Release "iBlast Unveils Comprehensive Video-On-Demand Solution", Apr. 16, 2001.

iBlast Press Release "iBlast Goes Gunning for Gamers With New Wirless Game Distribution", May 17, 2002.

Printed web page of dtvplus.com on May 19, 2003.

DTV Plus Press Release "DTV Plus showcases service at Intel's Center for Datacasting Innovation", Oct. 25, 1999.

DTV Plus Press Release "Capitol Broadcasting and accessDTV First to Offer Convergence of DTV and PC", May 9, 2001.

\* cited by examiner

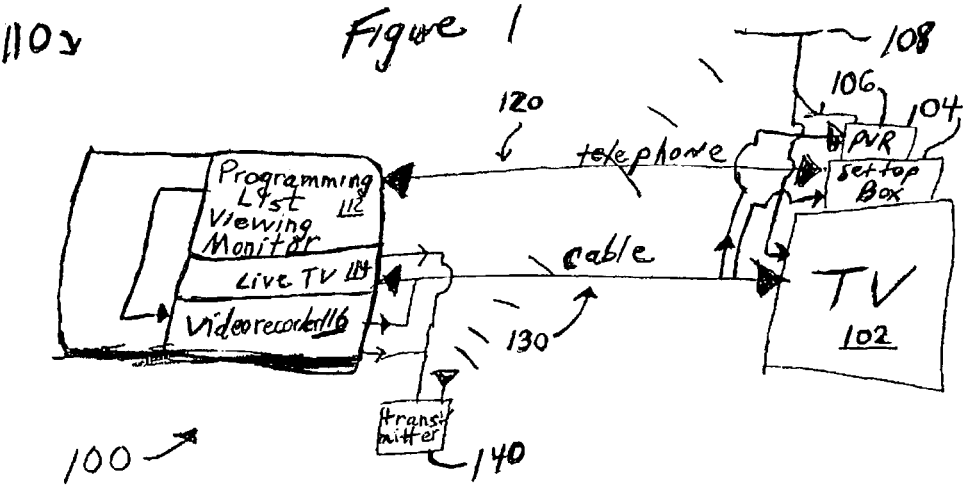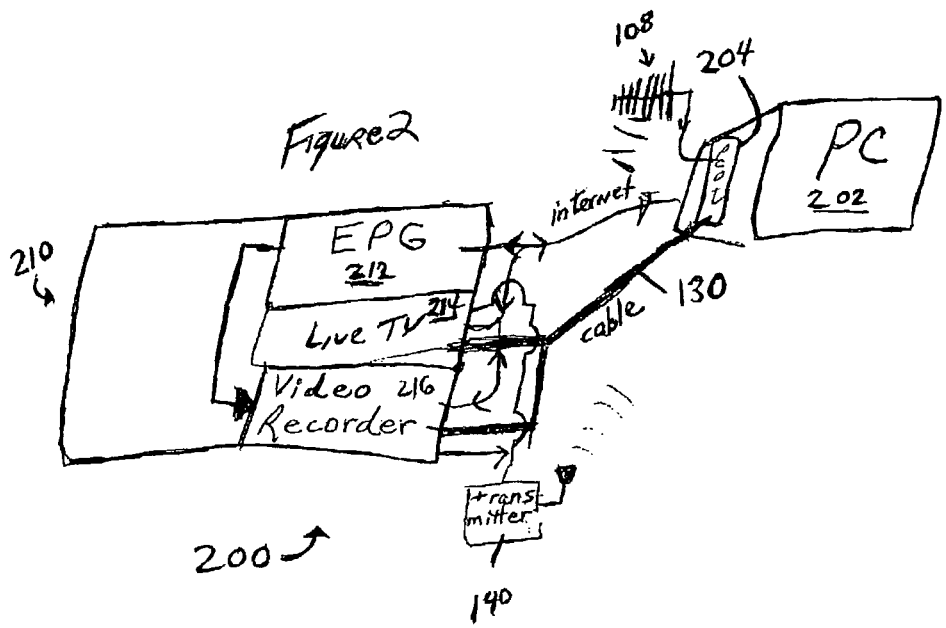

SYSTEM AND METHOD FOR DELIVERING DATA OVER AN HDTV DIGITAL TELEVISION SPECTRUM

CROSS REFERENCE TO RELATED APPLICATIONS

This application is a continuation-in-part application of co-pending patent application entitled "SYSTEM AND METHOD FOR DELIVERING RERUN VIDEO PROGRAMMING ON NON-HDTV DIGITAL SIDE CHANNELS" having Ser. No. 09/681,846, which was filed on Jun. 15, 2001, by Kenneth A. Franken and Jack Perry and assigned to the same assignee, and also relates to co-pending patent application entitled "GUIDE WITH PROGRAM DELIVERING LINKS", having Ser. No. 09/681,275, which was filed on Mar. 12, 2001, by Kenneth A. Franken, Toufic Moubarak and Jack Perry, and also assigned to the same assignee, which patent applications are incorporated herein in their entirety by this reference.

BACKGROUND OF INVENTION

In recent months, digital television has been gaining popularity with U.S. viewers. More and more local broadcasters are switching to digital transmission of television signals. In 2003, it is believed that almost all U.S. local broadcasters will be broadcasting at least part of their programming in a digital format. By 2006, many expect that digital television will be the exclusive mode of delivering live and rerun television programming in the United States.

While digital television broadcasting is a necessity for delivering high definition television (HDTV), the converse is not the case. In fact, there may be some advantages to not providing HDTV broadcasts at all times. For example, if a digital television station is not broadcasting in HDTV mode, then it is not using up its allotted spectral bandwidth. The extra bandwidth can then take the form of several digital side bands or side channels. These side channels can be used to broadcast any type of programming. Data programming, in the form of non-video textual information, consumes very little bandwidth. A typical local broadcaster's spectral allotment can simultaneously support scores of mere data channels or at least several non-HDTV television video broadcasts.

While it has been widely accepted that these side channels will exist, their optimal use has not been well understood. The most salient problem is that if the station is broadcasting some of its programming in HDTV mode, it may not be able to simultaneously and continuously provide a digital non-HDTV video side channel. Additionally, the amount of bandwidth used by a digital HDTV broadcast is not constant over time. These factors create serious limitations of the utility of this unused bandwidth.

Consequently, there exists a need for improved methods and systems for utilizing digital side channels.

SUMMARY OF INVENTION

It is an object of the present invention to provide a system and method for delivering data on digital side bands.

It is a feature of the present invention to utilize a real time monitor of the bandwidth being consumed by an HDTV broadcast.

It is another feature of the present invention to include automation of transmission of data, unrelated to the HDTV broadcast, using a variable available bandwidth.

It is an advantage of the present invention to achieve efficient use of available digital side channels.

The present invention is an apparatus and method for delivering data on digital side channels, which is designed to satisfy the aforementioned needs, provide the previously stated objects, include the above-listed features, and achieve the already articulated advantages. The present invention is carried out in a non-constant manner in a sense that the data delivery is done over a variable bandwidth unused spectral allocation.

Accordingly, the present invention is a system and method including a bandwidth monitoring mechanism for automatically determining available bandwidth of an HDTV broadcaster and using the variable available bandwidth to transmit data.

BRIEF DESCRIPTION OF DRAWINGS

The invention may be more fully understood by reading the following description of the preferred embodiments of the invention, in conjunction with the appended drawings wherein:

FIG. 1 is a block diagram of the major functional components of one embodiment of television and PVR recording system of the present invention, which uses a telephone line to communicate programming and viewership information.

FIG. 2 is a personal computer variation of the present invention which uses the Internet to communicate programming and viewership information and in some instances, video programming delivery as well.

DETAILED DESCRIPTION

Figure 3:
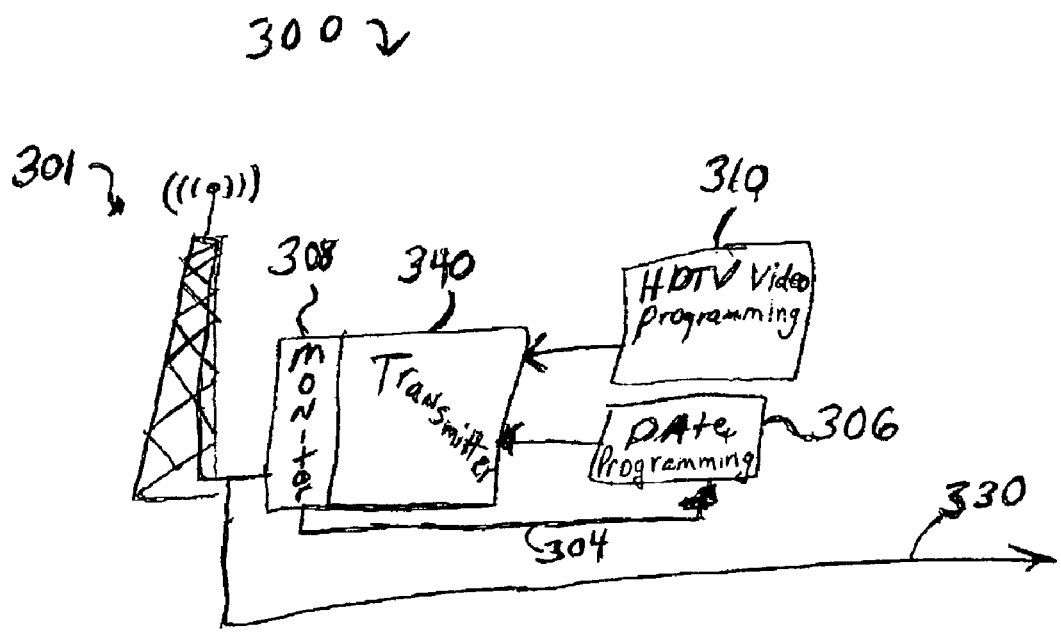
FIG. 3 is a block diagram of the major functional components of one embodiment of television and data digital transmission system of the present invention, which uses a bandwidth monitor to determine varying available bandwidth.

Now referring to the drawings wherein like numerals refer to like matter throughout, and more specifically to FIG. 1, there is shown a television/radio programming delivery system of the present invention generally designated 100; a source of video programming 110 is also shown. It should be noted that the present description is focused upon television and video signals, but the innovative aspects of the present invention could be used with respect to radio programming and audio only components of television and video signals.

This source of video programming 110 may be a local HDTV television station or other source of HDTV video programming. Source of video programming 110 generally provides live digital television service to many consumers coupled to the source of video programming 110 via standard cable television (CATV) co-axial cable, via terrestrial over-the-air broadcasts, or some other means of delivery of digital video signals. CATV cable 130 or digital television transmitter 140 would be the most common means of delivering digital video signals to these consumers' television set 102. Digital television transmitter 140 would transmit signals which are received by the consumer with digital television antenna 108, which signals are then supplied to the television set 102 and to the set top box 104, and/or personal video recorder 106. The television set 102 is preferably a digital television, but it may be a conventional analog television coupled to a set top box 104 which receives digital signals and converts them to analog signals for use by the television set 102.

Set top box 104 may have several other functions as well. For example, set top box 104 could be a digital personal video recorder much like the TiVo system or the Replay TV system. TiVo is a registered trademark of TiVo, Inc., 2160 Gold Street, P.O. Box 2160, Alviso, Calif. 95002; and Replay TV is a registered trademark of Replay TV, Inc., 1945 Charleston Road, Mountain View, Calif. 94043. Essentially, these well-known devices communicate via telephone lines 120 with some remote source of video program listings. These TiVo or Replay TV service sites are not typically associated with a local television station as shown in FIG. 1, but these services could be combined or coordinated, so that FIG. 1 is generally accurate. Set top box 104 may receive a list of programming via telephone line 120 in a well-known manner. The consumer programs set top box 104 to record programs from a programming guide which is downloaded, via telephone line 120, from programming list and viewing monitor 112. The set top box 104 and personal video recorder 106 are shown as separate devices. When this is the case, the set top box 104 can provide the two-way communication via telephone line 120 between the consumer and the source of video programming 110, and the personal video recorder 106 can perform the actual step of recording the programming. In other arrangements, set top box 104 and personal video recorder 106 could be combined in a single unit. This single unit would be similar to the TiVo and Replay TV systems in use today except that they would permit recording in a non-continuous and other than real time manner, as well as recording live broadcasts in real time. Telephone line 120 is representative of various possible communication systems which could be employed to communicate such information. For example, telephone line 120 could be replaced with the Internet, over-the-air RF transmissions, or signals sent over the CATV cable 130. Telephone line 120 is included as a possible currently preferred embodiment, but it is anticipated that it may not remain the preferred means of communication between programming list and viewing monitor 112 and the consumer in the future. Set top box 104 and personal video recorder 106 may be simple variations of currently available products. The Applicants assert that these variations or changes required are sufficiently simple that a person skilled in the art, with the aid of this description of the invention, could design a functional system without undue experimentation.

The present invention of FIG. 1 could function as follows: the consumer decides to watch live television. The consumer selects the channel to watch, using a live programming list which has been downloaded, via telephone line 120, from programming list and viewing monitor 112. Programming list and viewing monitor 112 is coupled to a large number of consumers who are watching many different channels. Programming list and viewing monitor 112 acts as a viewing monitor, in that it captures, tallies and processes the viewership information from the many consumers. Programming list and viewing monitor 112 makes a determination of programs which receive the highest viewership, and these programs are ranked. This ranking of popular programs being watched is provided to video recorder 116. Programming list and viewing monitor 112 may be a personal computer or other processor which is adapted to perform the functions of providing a programming list and monitoring the viewership of the programs on that list. It should be understood that the functions of providing a list and monitoring of viewership need not be performed by the same computer, but it may be preferred that they are so combined.

Video recorder 116 may be a very large recorder or banks of smaller coordinated recorders. The video recorder 116 need not store the programming in a digital file suitable for playing by the personal video recorder 106 (or with respect to FIG. 2 discussed below, the PC digital TV board 204, which can act just like a personal video recorder 106 if provided with suitable software). Video recorder 116 may or may not have a recording segment which records the programming in the same format as it is broadcast live via source of live television broadcasts 114. It may have a conversion segment which converts the stored programming to a file format which is directly usable by personal video recorder 106. It may be preferred to transmit the rerun programming to the television set 102 in a format similar to the live format and leave to the personal video recorder 106, the conversion of the stream of digital information to a file to be saved to a hard disk in personal video recorder 106.

Video recorder 116 may record every program which is being provided to the consumer via source of live television broadcasts 114, or it may, because of resource limitations, record only the most popular programs being watched. In any scenario, the video recorder 116 may, in some way, use the ranking of popular programs to regulate recording, retention, or delivery of rerun programs to consumers.

In one embodiment of the present invention, programming list and viewing monitor 112 and video recorder 116 could cooperate, so that programming list and viewing monitor 112 makes a real time determination of the popularity of each programming being watched by the various consumers coupled to the system. Programming list and viewing monitor 112 or video recorder 116 could compare the rankings or "ratings" of each of the programs to a threshold level. If the show has sufficiently high ranking or ratings, then it could be selected to be recorded by video recorder 116. The threshold may be a fixed threshold or a threshold which is higher than the least popular program which has been recently recorded. Depending upon storage space for programming and the ability for simultaneous recording, these thresholds may vary from system to system.

For "live" TV, video recorder 116 would need to record all content (or at least the start of the content) and then use ratings information to decide which content to keep and which content to recycle for space. In other words, the ratings information will, in general, lag somewhat behind the content, so the content must be buffered to account for this lag.

It should be understood that this automation of the recording process based upon rankings of live television broadcast could be performed by programming list and viewing monitor 112, video recorder 116 or a separate and distinct processor (not shown). The amount of integration of the processing functions of the present invention is a matter of designer's choice, and it is expected that it will vary, depending upon any peculiar requirements of any particular system.

In one embodiment for recording live TV, a recorder could record all the content and after a relatively short time, ratings information from a rating organization, such as Nielson, etc., could be used to select the most popular programs for retention.

When the source of live television broadcasts 114 is broadcasting in other than HDTV mode, there will be a capability to provide substantial access to programs stored by video recorder 116. The consumer could, even after the fact, decide to record a program that was broadcast earlier. For example, if a consumer were to meet with some friends who said that they had watched a great program the night before on television, under a prior art system such as TiVo or Replay TV, they would be unable to record. But with the present invention, the video recorder 116 may have recorded and retained the program, based upon the determination of the program's ranking by programming list and viewing monitor 112. Programming list and viewing monitor 112 would display to the consumer not only a list of live future programming which will become available, but also a listing of previously run programming which could be delivered from the video recorder 116. If a viewer sees a previously run program on the list which appeals to the viewer, the viewer can select the rerun program for delivery. The program could be in HDTV format or non-HDTV format. Depending upon available bandwidth in the digital side bands or side channel at any given time, the selected rerun programming can be delivered at varying transmission rates. The terms "digital side bands" or "digital side channels" as used herein are intended to refer to transmission spectra which is unused by a primary live digital television broadcast. Video recorder 116 may provide the digital signal to the personal video recorder 106 in less than real time. This would often be the case when the program being rerun is an HDTV formatted program, and it is being transmitted during a time when source of live television broadcasts 114 is broadcasting live in HDTV format. However, if the program being provided is non-HDTV programming, and it is being delivered at a time when the source of live television broadcasts 114 is delivering non-HDTV programming, the delivery rate of the rerun programming may be at a rate faster than done with real time viewing. The delivery of the rerun programming need not be continuous. The program may be divided into separate smaller files and delivered at different times. The consumer, of course, will need to wait for the entire rerun program to be received by the personal video recorder 106 before it can be viewed. The rerun programming is, therefore, delivered to the consumer who made a decision to record/receive a program after the live broadcast has occurred.

Depending on space and bandwidth limitations, it might be advantageous to compress the stored programming by using lower quality or alternative encoding schemes. This compression could be performed before the content is initially stored, saving storage space and bandwidth, or just prior to broadcast, saving bandwidth only.

Ratings information could also be applied to the stored content to determine what content is kept. As content ages, cumulative or recent ratings information could be used to decide whether the content is dropped or compressed to free up storage space. Discussions of space vs. popularity tradeoffs in a caching network are commonplace on Internet web pages, such as freenetproject.org.

The recording of the rerun programs would be similar to current TiVo and Replay TV systems in the sense that the personal video recorder 106 would be programmed to start and stop recording at particular times and on predetermined digital side channels. (Note: the consumer would not need to know the precise times of delivery of the rerun program; the personal video recorder 106 would automatically start and stop as programmed.) The signal actually being received by the personal video recorder 106 may be at other than real time and, therefore, may not be capable of being viewed in real time by a television set tuned to the side channel. The source of video programming 110 would create a schedule of times for broadcasting the rerun programs to be recorded by the many personal video recorders 106 by the many users. The scheduling of the rerunning of the programs can be manipulated in many ways. The viewer's selection of the program need not be communicated back to source of video programming 110. It could be done completely at the viewer's location; this assumes that the programming list and viewing monitor 112 provides a complete copy of the programming list to the set top box 104 or the personal video recorder 106.

While it may not be necessary for the viewer's recording choice to be conveyed to the source of video programming 110, it may be desirable for other business reasons to provide this information, so that it may be used internally or be reported to interested third parties.

Viewer recording choices could also be used as feedback to control the scheduling of re-run broadcasts. That is, programs with a higher number of outstanding requests would have a higher priority compared to programs with a low number of outstanding requests. The field of determining resource allocation among processes with varying priorities is well studied; e.g., computer OS design.

Now referring to FIG. 2, there is shown an alternate embodiment of the present invention in which the consumer is not viewing a program via a television set, but instead via a personal computer 202. Personal computer 202 has disposed therein a PC digital TV board 204, which is used to receive television signals, via CATV cable 130, or via a transmission from digital television transmitter 140. PC digital TV board 204 tunes these signals and provides the personal computer 202 with a signal which is viewable by the personal computer 202. PC digital TV board 204 could also be adapted and configured with software to perform the function of a PVR similar to personal video recorder 106. Also, personal computer 202 could receive programming via the internet without the need for a PC digital TV board 204. It is understood that personal computer 202 and television set 102 need not be viewed as distinct entities. In fact, it is well understood that television sets may be configured to provide functionality more commonly associated with personal computers and vice versa. The present invention is intended to be read inclusively so as to cover future convergence of television with personal computing. The system generally designated 200 of FIG. 2 performs essentially the same functions as the system 100 of FIG. 1. System 200 includes an electronic programming guide with tuning links 212, which could be a website on the Internet, such as described in the above-referenced co-pending patent application. Electronic programming guide with tuning links 212 could also provide a monitoring function similar to that performed by programming list and viewing monitor 112 where a ranking of the most popular programs being watched on live television is maintained. This ranking is provided to internet coupled video recorder 216 just as was done with respect to the system 100 (FIG. 1). Internet coupled video recorder 216 is similar to video recorder 116 except that it is coupled to the internet and is capable of delivering files (rerun programming) via the internet. Similarly, source of live television broadcasts 214 could be a digital television station similar to source of live television broadcasts 114 except that it is also adapted and configured to provide programming over the Internet.

Now referring to FIG. 3, there is shown a television/data delivery system of the present invention generally designated 300 and a source of HDTV video programming 310.

This source of video programming 310 may be a local HDTV television station or other source of HDTV video programming. Source of video programming 310 generally provides live digital television service to many consumers coupled to the source of video programming 310 via standard cable television (CATV) co-axial cable 330, via terrestrial over-the-air broadcasts through antenna 301, or some other means of delivery of digital video signals. A local broadcaster may desire to utilize any unused portion of its spectral allocation. Bandwidth monitor 308 is coupled to transmitter 340 and monitors the amount of the broadcaster's spectral allocation which is being consumed. Feedback regarding the available bandwidth is provided on line 304 to source of data programming 306. More data is transmitted when the portion of the bandwidth not used by the HDTV broadcast increases. The data being provided can be any type of data; however, it is expected that most of the data will be data which is unrelated to the HDTV program being simultaneously broadcast.

Data will be deemed to be related to the HDTV broadcast if there is something in the HDTV video broadcast which displays, shows, or even merely suggests a subject for which a viewer may decide to obtain more information. For example, a television program may show the lead actress driving a sports car. When a viewer is viewing the program on a PCTV equipped computer, then the viewer may click on the sports car and receive additional information in a pop-up window relating to the make and model of sports car. Such data about the sports car would be deemed to be related to HDTV broadcast. However, since there may be a very sizable unused spectral allocation at time, it may be desirable to transmit data beyond that which is related to the HDTV broadcast. The data being transmitted can be any type of data such as rerun programs, as discussed in the above-referenced patent application, or it can be any type of data.

The present invention can be delivered, as discussed in the above-referenced application, in response to monitoring of viewer selections, etc. The data being delivered can be HDTV video programming in less than real time, or it may be non-HDTV video programming delivered in less than real time, real time or greater than real time.

Figure 4:
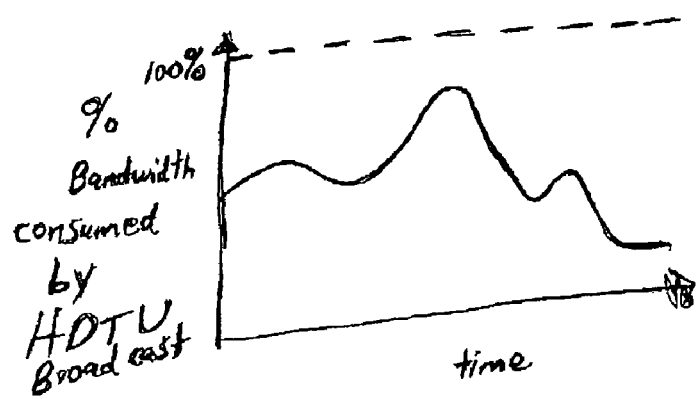
FIG. 4 is a simplified bandwidth consumed by HDTV broadcast vs. time plot.

Now referring to FIG. 4, there is shown a simplified bandwidth consumed by HDTV broadcast vs. time plot. The area below the curve represents the portion of the broadcaster's spectral allocation which is being consumed by the HDTV broadcast. The area above the curve represents available bandwidth. If a broadcaster desires to transmit large amounts of data, they may choose to not broadcast in HDTV format during late night/early morning hours; e.g., between 2:00 AM and 4:00 AM. This would create a very sizable area above the curve which is available for data transmission. The variation in the percentage of bandwidth being consumed by the HDTV broadcast is also dependent upon other numerous factors, including the level of detail in the graphical images being displayed, as well as in the number of colors and the quality of audio etc.

In another embodiment of the present invention, the HDTV broadcast may be switched to a non-HDTV broadcast during commercial breaks. Advertisers can be given a choice of transmitting their ads with HDTV quality or less than HDTV quality. The broadcaster can give a discount to advertisers who choose the non-HDTV commercial broadcast. The reduction in revenue can be offset by increased revenues generated by data transmission which is enabled by the increase in bandwidth not used to carry the broadcaster's primary video programming.

It should be understood that this automation of the data transmission process based upon monitored available bandwidth could be carried out in a multitude of ways. The amount of integration or separation of the processing functions of the present invention is a matter of designer's choice, and it is expected that it will vary, depending upon any peculiar requirements of any particular system.

In one embodiment, all of the structure in FIG. 1, except for the antenna, may be performed or aided by a single computer or a collection of networked computers.

Depending on space and bandwidth limitations, it might be advantageous to compress the stored data by using lower quality or alternative encoding schemes. This compression could be performed before the content is initially stored, saving storage space and bandwidth, or just prior to broadcast, saving bandwidth only.

It is thought that the method and apparatus of the present invention will be understood from the foregoing description and that it will be apparent that various changes may be made in the form, construction, steps and arrangement of the parts and steps thereof, without departing from the spirit and scope of the invention or sacrificing all of their material advantages. The form herein described is merely a preferred or exemplary embodiment thereof.

The invention claimed is:

1. A system of providing data programming to consumers comprising:
   means for directly providing an HDTV broadcast of a live television program in HDTV format to a plurality of consumer premises over a first over-the-air terrestrial transmission means, having a consistent total bandwidth, where a level of bandwidth consumed by the HDTV broadcast is independent of the number of viewers;
   means for monitoring a level of available bandwidth of said means for directly providing an HDTV broadcast in excess of that bandwidth which is consumed by the HDTV broadcast;
   means for providing rerun programs, to a viewer at one of said plurality of consumer premises, over a first over-the-air terrestrial transmission means in a volume which is commensurate with said level of available bandwidth; wherein content of said rerun programs is selected via viewership feedback of viewership information of previously commenced live broadcasts;
   said means for monitoring a level further configured for monitoring a variable level with intermediate levels between a bottom level of no use and a top level of fully consumed.

2. A system of claim 1 wherein said data is unrelated to said live television program in HDTV format.

3. A system of claim 1 wherein said means for monitoring monitors said level continuously over a period of time and provides feedback, on a real time basis, to said means for providing data; and said means for providing rerun programs utilizing real time viewership data to select programs, based upon popularity of such programs when being broadcast live, which will be made available for viewing via inclusion in the rerun programs.

4. A system of claim 1 wherein said means for monitoring monitors said level continuously over a period of time and provides feedback, on a real time basis, to said means for providing data.

5. A system of claim 4 wherein said means for directly providing an HDTV broadcast of a live television signal utilizes a broadcast antenna.

6. A system of claim 5 further comprising a timing means for increasing said level of available bandwidth during early morning hours.

7. A system of providing data programming to consumers comprising:
   means for directly providing an HDTV broadcast of a live television program in HDTV format to a plurality of consumer premises over a first over-the-air terrestrial transmission means, having a consistent total bandwidth, where a level of bandwidth consumed by the HDTV broadcast is independent of the number of viewers;

means for monitoring a level of available bandwidth of said means for directly providing an HDTV broadcast in excess of that bandwidth which is consumed by the HDTV broadcast; and, means for providing rerun programming data, to a viewer at one of said plurality of consumer premises, over a first over-the-air terrestrial transmission means in a volume which is commensurate with said level of available bandwidth; wherein content of said rerun programming data is selected via viewership feedback of viewership information of previously commenced live broadcasts;

said means for monitoring a level further configured for monitoring a variable level with intermediate levels between a bottom level of no use and a top level of fully consumed;

wherein said means for monitoring monitors said level continuously over a period of time and provides feedback, on a real time basis, to said means for providing data; and said means for providing rerun programming data utilizing real time viewership data to select programs, based upon popularity of such programs when being broadcast live, which will be made available for viewing via inclusion in the rerun programming data; and wherein said means for directly providing an HDTV broadcast of a live television signal utilizes a broadcast antenna; and said means for providing rerun programming data utilizes an initial recording of an initial plurality of different simultaneously broadcast live broadcasts followed by a reduction in said initial plurality of different simultaneously broadcast live broadcasts based upon real time receipt of relative viewership information of each of said initial plurality of different simultaneously broadcast live broadcasts.

8. A method of providing rerun programming via side channels of a high definition digital terrestrially broadcast television transmission, said method comprising the steps of:

monitoring a first plurality of viewers to determine a popularity ranking of a first plurality of live video programs;

distributing a first video program to a second plurality of viewers, where said second plurality of viewers did not select and did not request delivery of said first video program; and wherein said step of distributing a first video program is done in response to said step of monitoring a first plurality of viewers; and where said first video program is a program selected based upon a relatively high popularity ranking among said first plurality of live video programs;

wherein said first video program comprise an entire video program which includes a portion of said first plurality of live video programs, which was previously distributed to said first plurality of viewers;

wherein said step of distributing a first video program is done using digital side channels of a terrestrial broadcast of a digital high definition television signal; and recording said first video program by one of said second plurality of viewers.

9. The method of claim 8 wherein said first plurality of live video programs comprises a first plurality of simultaneously broadcast live video programs.

10. The method of claim 8 wherein said step of recording said first video program is at first done such that a first portion of said first program is recorded without regard to said first step of monitoring said first plurality of viewers, and a second portion of said first program is done in response to said step of monitoring said first plurality of viewers.

11. The method of claim 10 further comprising the steps of simultaneously recording, on a video recorder, a plurality of simultaneously broadcast programs of said first plurality of live programs until said step of monitoring a first plurality of viewers results in a selection of said first program and termination of said step of simultaneously recording a plurality of programs by terminating recording of all of such plurality of simultaneously broadcast programs except for said first program.

12. The method of claim 11 wherein said step of monitoring said first plurality of viewers further comprises providing, via data download, a live programming list to said first plurality of viewers.

13. The method of claim 12 where said selection of said first program comprises comparing a popularity rank to a predetermined threshold popularity.

14. The method of claim 13 wherein said predetermined threshold is fixed.

15. The method of claim 13 wherein said predetermined threshold is a threshold of higher than a least popular program that was recorded and remains stored on the video recorder.

16. A system of providing rerun programming via side channels of an high definition digital terrestrially broadcast television transmission, said method comprising:

means for monitoring a first plurality of viewers to determine a popularity ranking of a first plurality of live video programs;

means for distributing a first video program to a second plurality of viewers, where said second plurality of viewers did not select and did not request delivery of said first video program; and wherein said means for distributing a first video program operates in response to said means for monitoring a first plurality of viewers; and where said first video program is a program selected based upon a relatively high popularity ranking among said first plurality of live video programs, and contains a portion of the first plurality of live video programs which had been previously distributed to said first plurality of viewers;

wherein said means for distributing a first video program uses digital side channels of a terrestrial broadcast of a digital high definition television signal; and means for recording said first video program by one of said second plurality of viewers.

17. The system of claim 16 wherein said first plurality of live video programs comprises a first plurality of simultaneously broadcast live video programs.

18. The system of claim 16 wherein said means for recording said first video program operates such that a first portion of said first program is recorded without regard to said first step of monitoring said first plurality of viewers, and a second portion of said first program is done in response to said step of monitoring said first plurality of viewers.

19. The system of claim 18 wherein said means for recording further performs the steps of simultaneously recording, on a video recorder, a plurality of simultaneously broadcast programs of said first plurality of live programs until said step of monitoring a first plurality of viewers results in a selection of said first program and termination of said step of simultaneously recording a plurality of programs by terminating recording of all of such plurality of simultaneously broadcast programs except for said first program.

20. The system of claim 19 wherein said means for monitoring said first plurality of viewers further provides, via data download, a live programming list to said first plurality of viewers.

21. The system of claim 20 where said selection of said first program comprises comparing a popularity rank to a predetermined threshold popularity.

22. The system of claim 21 wherein said predetermined threshold is fixed.

23. The system of claim 21 wherein said predetermined threshold is a threshold of higher than a least popular program that was recorded and remains stored on the video recorder.

* * * * *